(12) United States Patent
Wvong et al.

(10) Patent No.: US 8,681,650 B2
(45) Date of Patent: Mar. 25, 2014

(54) SYSTEMS, METHODS, AND COMPUTER READABLE MEDIA FOR PACKET CLASSIFICATION PREVIEWING

(75) Inventors: Russil Wvong, Vancouver (CA); Silviu Ionut Niculescu, Bucharest (RO); Toni Nakamoto, Vancouver (CA)

(73) Assignee: Ixia, Calabasas, CA (US)

( * ) Notice: Subject to any disclaimer, the term of this patent is extended or adjusted under 35 U.S.C. 154(b) by 121 days.

(21) Appl. No.: 13/224,080

(22) Filed: Sep. 1, 2011

(65) Prior Publication Data

US 2013/0058230 A1 Mar. 7, 2013

(51) Int. Cl.
*H04L 12/26* (2006.01)
*H04L 1/00* (2006.01)
*G06F 15/16* (2006.01)

(52) U.S. Cl.
USPC .......................................... 370/252

(58) Field of Classification Search
None
See application file for complete search history.

(56) References Cited

U.S. PATENT DOCUMENTS

| | | | |
|---|---|---|---|
| 7,203,963 B1 | 4/2007 | Wu et al. | |
| 7,580,356 B1 | 8/2009 | Mishra et al. | |
| 7,639,613 B1 | 12/2009 | Ghannadian et al. | |
| 7,706,289 B2 | 4/2010 | Puri et al. | |
| 2003/0131116 A1* | 7/2003 | Jain et al. | 709/230 |
| 2004/0109411 A1 | 6/2004 | Martin | |
| 2008/0232269 A1* | 9/2008 | Tatman et al. | 370/252 |
| 2010/0142374 A1* | 6/2010 | Yoon et al. | 370/235 |

OTHER PUBLICATIONS

"ImpairNet Impairment Load Module," http://www.ixiacom.com/products/impairnet/ index.php, PN: 915-3065-01, Rev. A, pp. 1-2 (May 2011).
"IxNetwork," http://www.ixiacom.com/products/ixnetwork, PN: 915-3003-01, Rev. B., pp. 1-4 (May 2001).
"IxNetwork: Specifications," www.ixiacom.com, P/N: 915-1801-02, Rev. E, pp. 1-23 (May 2011).
"ImpairNet™ EIM1G4S and EIM10G4S Ethernet Impairment Load Module," www.ixiacom.com, P/N: 915-0603-01, Rev. B, pp. 1-4 (May 2011).
Fornoles et al., "10-Gigabit Ethernet Switch Performance Testing," White Paper, IXIA, pp. 1-31 (Copyright 2004).

* cited by examiner

*Primary Examiner* — Chirag Shah
*Assistant Examiner* — Srinivasa Reddivalam
(74) *Attorney, Agent, or Firm* — Jenkins, Wilson, Taylor & Hunt, P.A.

(57) ABSTRACT

Methods, systems, and computer readable media for packet classification previewing are disclosed. Packet classification previewing is performed by a reserved preview packet classifier and initiated by a user. According to one aspect, a method for packet classification previewing includes providing a preview packet classifier. User input is received to classify packets using the preview packet classifier. In response to the user input, classification of packets is initiated using the preview packet classifier. Preview packet classification results are generated and displayed to the user, providing feedback as to whether the classifier configuration is correct or not as the user changes the configuration dynamically.

18 Claims, 5 Drawing Sheets

SYSTEMS, METHODS, AND COMPUTER READABLE MEDIA FOR PACKET CLASSIFICATION PREVIEWING

TECHNICAL FIELD

The subject matter described herein relates to methods and systems for packet classification previewing.

BACKGROUND

High-speed network impairment instruments contain a small, fixed number of packet classifiers in order to classify packets based on their contents. These packet classifiers match and isolate relevant data flows. In an impairment instrument, these data flows are subjected to different kinds of impairment, such as adding delay to a flow or randomly dropping packets from a flow, in order to emulate the behavior of a Wide Area Network link.

The user provides configuration data to set up each packet classifier. If the user makes an error in configuring the classifier, and the wrong packets are classified or no packets are classified due to the configuration error, impairment functions of the instrument will either be invoked unnecessarily or not invoked when they should be. In addition, such configuration errors may not be immediately discoverable as the user is required to search through packet classification results to determine the effects of the filter configuration.

In light of these disadvantages, there exists a need to show the user a preview of the packets matching the current classifier configuration, while they are changing the configuration.

SUMMARY

According to one aspect, the subject matter described herein includes a system for packet classification previewing. The system comprises an interface configured to receive a plurality of packets. The system further comprises a dedicated preview packet classifier configured to receive dynamic user input to classify packets, to generate preview packet classification results, and to display the preview packet classification results to the user as the user changes the packet classification criteria.

According to another aspect, the subject matter described herein includes a method for packet classification previewing. The method comprises providing a preview packet classifier. User input to classify a packet using the preview packet classifier is received. In response to the user input, classification of packets using the preview packet classifier is initiated. Preview packet classification results are generated and displayed.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for packet classification previewing.

Reference will now be made in detail to exemplary embodiments of the present invention, examples of which are illustrated in the accompanying drawings. Wherever possible, the same reference numbers will be used throughout the drawings to refer to the same or like parts.

Packet classifiers may be utilized in a number of instruments. For example, packet classifiers may be standalone components within a system, they may be contained within a router, or they may be contained within an impairment instrument. These impairment instruments may emulate real-life network impairments for the purpose of testing network equipment. For example, network impairment instruments may add delay to received packets and/or randomly drop the received packets.

Figure 1:
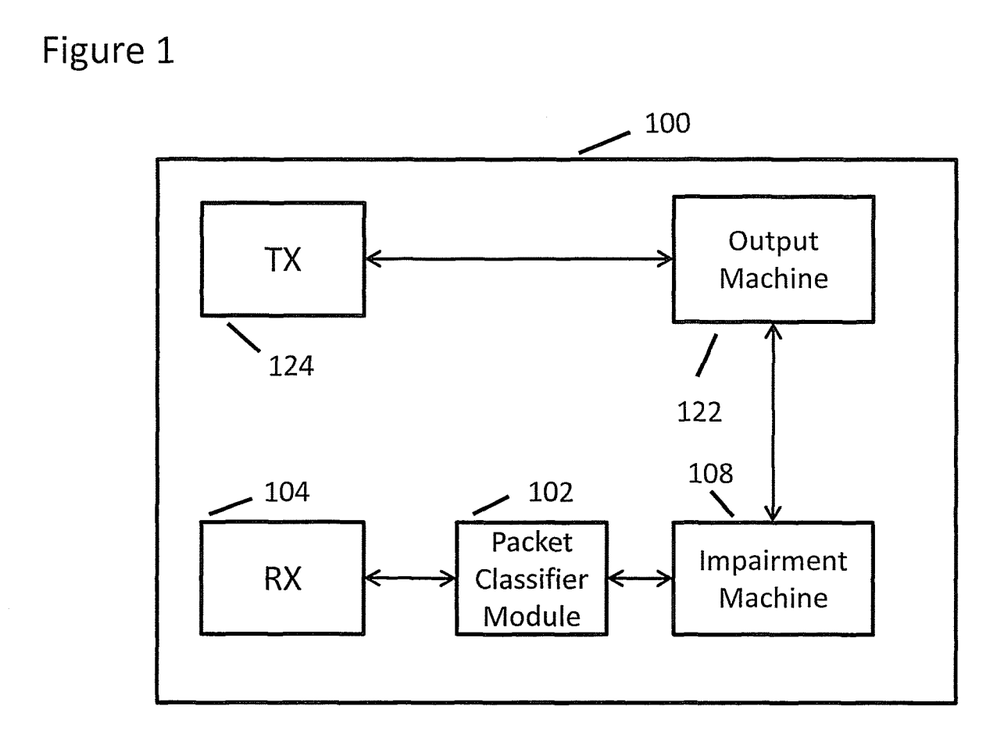
FIG. 1 is a block diagram illustrating an impairment instrument containing a preview packet classifier according to an embodiment of the subject matter described herein.

FIG. 1 is a block diagram illustrating an impairment instrument 100 containing a packet classifier module 102. Packets may be received by a packet classifier module 102 from an input interface 104. Packet classifier module 102 may classify packets to a number of data flows. In other words, the packet classifier module 102 may match and isolate relevant data flows. This classification may be based on information contained in packet headers. The packets may be packets of various protocols and applications, such as bridging, routing, carrier Ethernet, broadband, Multiprotocol Label Switching (MPLS), Internet Protocol version 4 (IPv4), Internet Protocol version 6 (IPv6), as well as other protocols. Packets of one type may be contained within packets of another type; for example, an IPv6 packet may be contained within an Ethernet packet. This encapsulating of packets may contain various levels of encapsulation. Header information used by packet classifier module 102 to classify packets may be based on an outer layer packet header or an encapsulated packet header.

Packets leaving the packet classifier module 102 may enter an impairment machine 108. Impairment machine 108 may impair packets of certain classifications. Impairment machine 108 may impair packets of a certain classification in one way and packets of another classification in another way. Impairment machine 108 may also impair a fraction of packets of certain classifications. Examples of impairments and other functions that may be performed by impairment machine 108 include delay, Service Level Agreement (SLA) validation, packet drop, reorder of packets, packet duplication, emulation of network or transmission error conditions through bit error insertion, Wide Area Network (WAN) forwarding error emulation, Ethernet Frame Check Sequence (FCS) correction, and emulation of fixed link speeds using rate limiting, for example. Impairment machine 108 may keep a number of impairment profiles for applying one or more impairments to one or more data flows or classifications. Impairment machine 108 may then forward packets to an output machine 122. Output machine 122 may output packets via a transmit interface 124.

Figure 2:
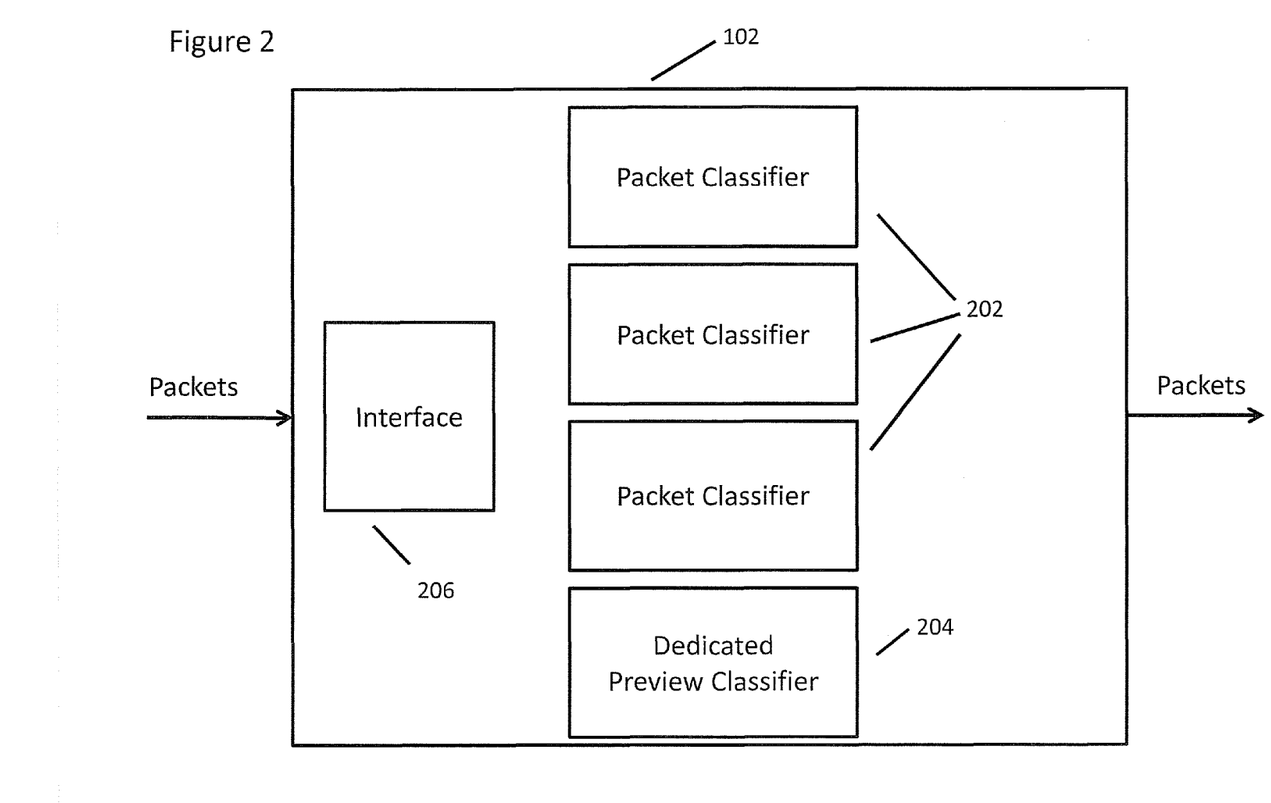
FIG. 2 is a block diagram illustrating a packet classifier module according to an embodiment of the subject matter described herein.

FIG. 2 is a block diagram illustrating a packet classifier module 102. Packet classifier module 102 may include an interface 206 which is configured to receive packets. Packet classifier module 102 may include one or more general purpose packet classifiers 202 as well as a dedicated preview packet classifier 204. Each general purpose classifier 202 may assign packets to data flows based on header information. In one embodiment, each general purpose packet classifier 202 may match and isolate multiple relevant data flows. Each general purpose packet classifier 202 may match and isolate data flows related to a particular test case. In one embodiment, each general purpose classifier 202 may match and isolate data flows which are to be subjected to certain kinds of impairments or impairment profiles.

Preview packet classifier 204 may match packets based on header information. Preview packet classifier 204 may be configured to receive user input to classify a packet. Preview packet classifier 204 may comprise dedicated resources for the sole purpose of packet classification previewing. Preview packet classifier 204 may be configured to initiate classification of packets in response to the user input. Instead of assigning packets to flows or isolating packets, as the general packet classifiers 202 may do, preview packet classifier 204 may simply keep a count of the matched packets. For example, packets may enter packet classifier module 102 and be examined by preview packet classifier 204 to determine whether packets match certain field values. Preview packet classifier 204 may be configured to generate preview packet classification results. Results may include a count of packets which the preview packet classifier 204 has classified. If the packet field values match field values assigned to the preview packet classifier 204, then the preview packet classifier 204 may increment a counter. Preview packet classifier 204 may not affect the function of any instrument in which it is a module, nor may it affect the function of any device to which it may be connected. For example, packets matching the filter defined by preview packet classifier 204 may be counted and forwarded without application of impairment or other device function. Instead, preview packet classifier 204 keeps a count of matched packets, which it may report to a user. Preview packet classifier 204 may not interfere with packets. In other words, preview packet classifier 204 may not alter any information contained within a packet or a packet header.

Preview packet classifier 204 offers benefits to a user. For example, a user may wish to determine what effect a planned change in packet classification may generate, without affecting packet classification or ongoing impairments. Preview packet classifier 204 gives the user this ability. A user may assign field values, such as packet header information, to preview packet classifier 204, for example, in a Graphical User Interface (GUI). A user may then initiate a preview function of preview packet classifier 204. When packet classification previewing is initiated, preview packet classifier 204 may begin to keep a record of the number of packets flowing through packet classifier module 200 which match the field values assigned to preview packet classifier 204. Preview packet classifier 204 may then report back to the user the number of packets that have entered packet classifier module 200 and which match field values assigned to preview packet classifier 204. This gives the user the ability to determine whether any packets flowing through packet classifier module 200 actually match a classification assigned to preview packet classifier 204. If the user determines, by observing a non-zero packet count in preview packet classifier 204, that packets match the classification, this gives the user feedback that the configuration or field values assigned to preview packet classifier 204 will function correctly if assigned to a general purpose packet classifier 202. If a user determines in this way that the configuration assigned to preview packet classifier 204 will function correctly, the user may then copy the configuration of the preview packet classifier 204 to a general purpose packet classifier 202 such that the general purpose packet classifier 202 may classify packets which match the configuration.

This is also beneficial, for example, if packet classifier module 200 is a component of a device, such as impairment instrument 100, which is currently performing functions. For example, if a general purpose packet classifier 202 is assigned a new configuration, and this configuration is incorrect, then packets containing the criteria that the user believed he/she assigned to the packet classifier module 200 will not be handled correctly by packet classifier module 200. But with preview packet classifier 204, a user can determine if a configuration is correct before assigning the configuration to a general purpose packet classifier 202.

Figure 3:
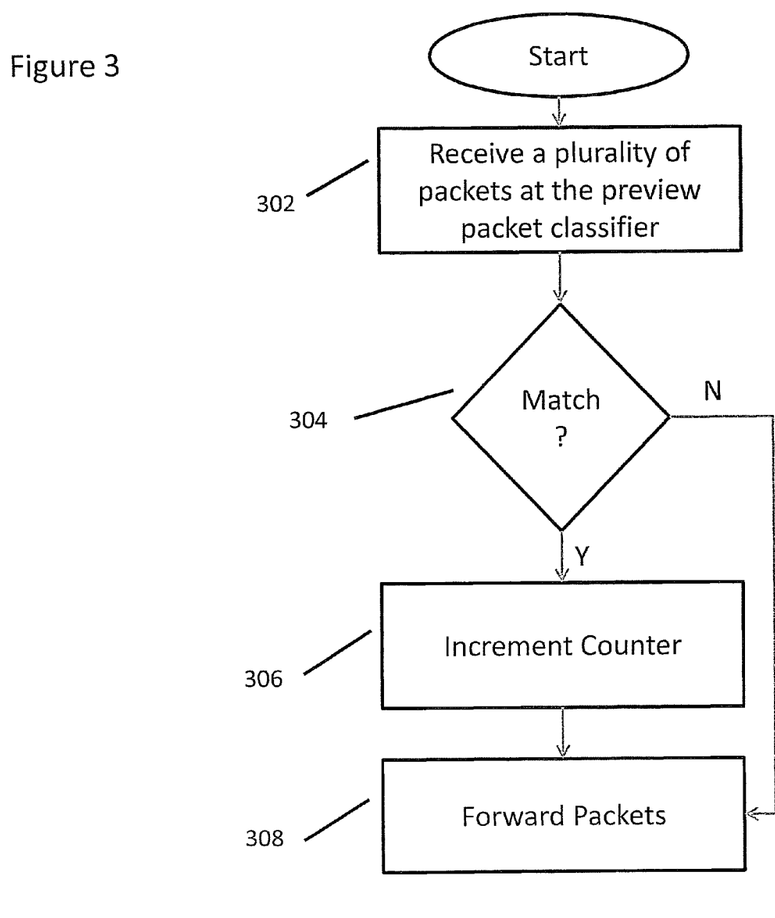
FIG. 3 is a flow chart illustrating an exemplary process for preview packet classification at packet classifier according to an embodiment of the subject matter described herein.

FIG. 3 is a flow chart illustrating an exemplary process for packet classification preview at a preview packet classifier 204. In block 302, a plurality of packets is received at preview packet classifier 204. This plurality of packets may include packets of different protocol types and containing different header information, such as protocol, origination address, destination address, where addresses may include Internet Protocol (IP) addresses and Media Access Control (MAC) addresses, for example. Packets may also be encapsulated within other packets.

In block 304, preview packet classifier 204 examines the plurality of packets to determine whether information contained within the packets match a certain configuration assigned to the preview packet classifier 204. For example, a configuration may include user-determined field values, such as a protocol, source or destination IP address, or source or destination MAC address. Preview packet classifier 204 configuration may be assigned to preview packet classifier 204 by a user, through a GUI, command prompt, or any other user interface.

At block 306, if preview packet classifier 204 determines that a packet matches the criteria assigned to the preview packet classifier 204, preview packet classifier 204 increments a counter. In one embodiment, this counter may be set to zero until a user informs preview packet classifier 204 that the preview packet classifier 204 should begin previewing packets. In one embodiment, the user has the ability to instruct preview packet classifier 204 to start and stop previewing packets. This allows the user to input a configuration into the preview packet classifier 204 and determine a count of packets that match the criteria assigned to preview packet classifier 204 within a particular amount of time. The counter is also available for a user to view via a user interface in real time. This allows the user immediate feedback from the instrument, suggesting the outcome of the configuration assigned to preview packet classifier 204. For example, if a user configures preview packet classifier 204 with a particular configuration, instructs preview packet classifier 204 to begin counting, and through a user interface determines that packets match these criteria, this provides feedback to the user that the configuration is a correct configuration. In turn, the user can apply the same configuration that is assigned to the preview packet classifier 204 to a general packet classifier 202, with a degree of certainty that the configuration is a correct configuration.

If no match is found in block 304, or when preview packet classifier 204 increments the match count in block 306, in block 308 preview packet classifier 204 transmits all packets it has received out of preview packet classifier 204. It is important to note that all packets exit preview packet classifier 204 in the same state in which they entered preview packet classifier 204. In other words, preview packet classifier 204 does not affect any function of any device in which it may be a module or to which it may be connected.

Figure 4:
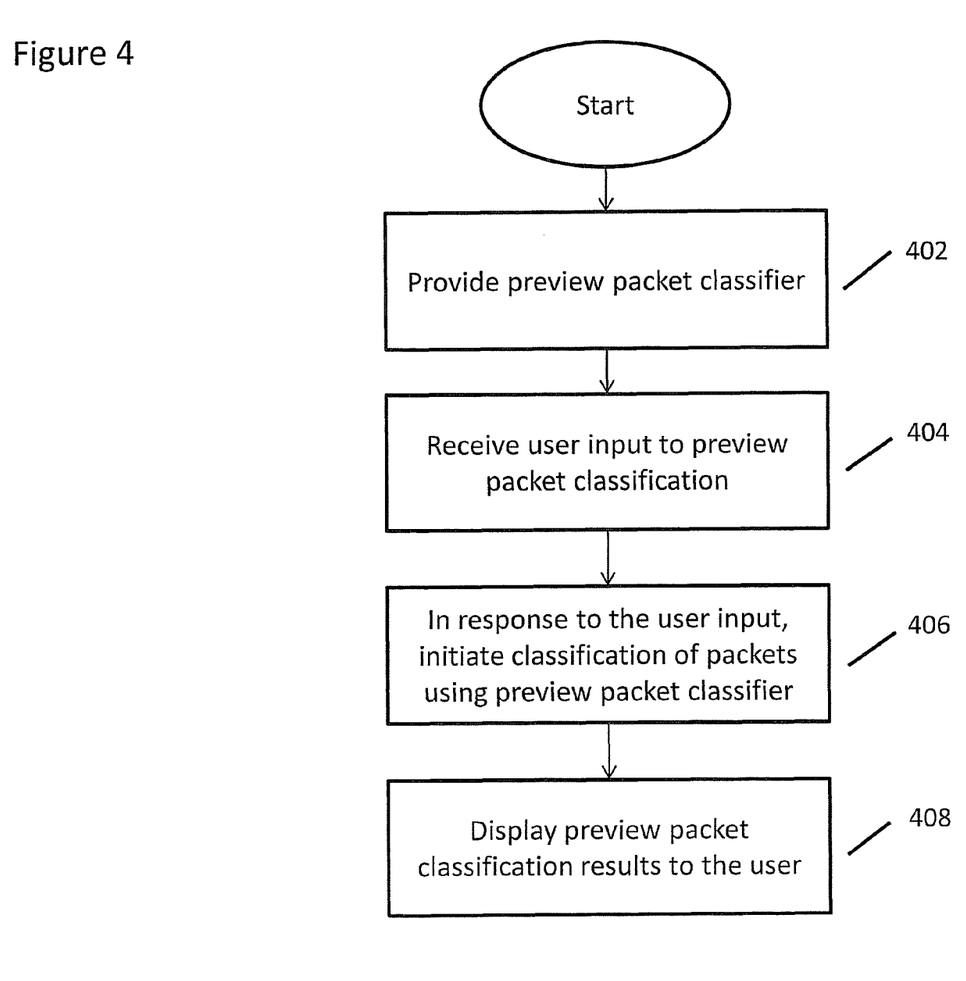
FIG. 4 is a flow chart illustrating an exemplary process for preview packet classification according to an embodiment of the subject matter described herein.

FIG. 4 is a flow chart illustrating an exemplary process for packet classification preview. In block 402, a preview packet classifier 204 is provided. This preview packet classifier 204 may be dedicated hardware within a system. The system may be an impairment instrument 100 such as that shown in FIG. 1.

In block 404, user input is received to classify packets using the preview packet classifier 204. This user input may include information such as information contained within the header of a packet. This information may include a protocol, a destination IP or MAC address, an origination IP or MAC address, a flow, and a next hop. User input may be received from a device external to the impairment instrument 100, such as a remote terminal.

In block 406, classification of packets using the preview packet classifier 204 is initiated in response to the user input. When information contained within a packet matches information given by a user in block 404, the packet is classified. When a packet is classified, a counter is incremented. A user may instruct the counter to be set zero, or the counter may be automatically set to zero when the user instructs preview packet classifier 204 to begin classification.

In block 408, preview packet classification results are displayed to the user. Preview packet classification results may include a count of the number of packets classified by preview packet classifier 204. This count may be provided by a counter which increments whenever packets are classified by preview packet classifier 204. The preview results may be displayed to a user through terminal connected to the system.

Figure 5:
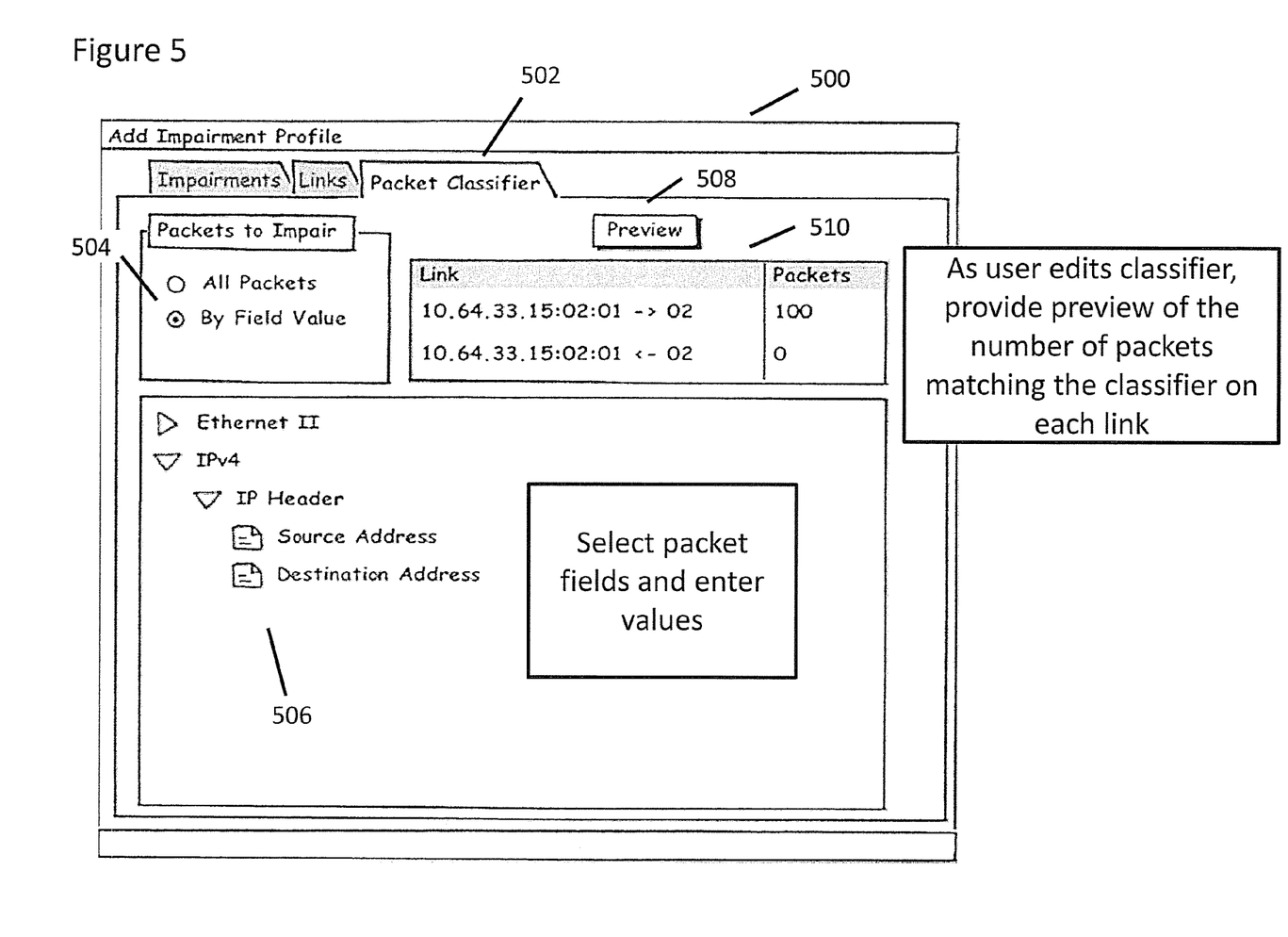
FIG. 5 is a representation of a Graphical User Interface for interfacing with an impairment instrument.

FIG. 5 is a representation of a GUI 500 for interfacing with impairment instrument 100. In the embodiment of FIG. 5, packet classifier tab 502 is selected in GUI 500. Portions of the packet classifier tab 502 may be used to alter settings of general purpose classifiers 202 and preview packet classifier 204, as well as display preview packet classification results.

Portion 504 of GUI 500 is used to select whether all packets traveling through impairment instrument 100 or only packets classified by general purpose classifier 202 will be impaired by impairment machine 108. If the "All Packets" button is selected, all packets traveling through impairment instrument 100 will be impaired. If the "By Field Value" button is selected, only packets classified by general purpose classifier 202 will be impaired.

Portion 506 allows a user to select a packet field and enter values to be used for general packet classification or preview packet classification. In the embodiment shown, a user may click on destination address field or source address field in order to enter values associated with these fields for the purpose of general packet classification or preview packet classification. Source address and destination address fields may be contained within an IP header section, and the IP header section may be contained within an IPv4 section. It will be understood that the sections and fields shown in FIG. 5 are representative and many other sections and fields may exist for use in general packet classification or preview packet classification.

After a user has entered values in portion 506 of GUI 500, the user may wish to preview the selected classification in preview packet classifier 204 before implementing the changes in a general purpose classifier 202. A user may preview the packet classification values entered in field 506 by selecting the preview button 508. When preview button 508 is selected, preview packet classifier 204 will begin to classify packets. At this point a user may begin to see preview packet classification results in portion 510 of GUI 500. Preview packet classification results will include a count of packets flowing through impairment instrument 100 which match the field values entered into portion 506. This functionality allows a user to determine whether or not packets flowing through impairment instrument 100 match the classification selected in portion 506, as well as how many packets match the classification. Furthermore, the preview packet classifier may not affect the function of any instrument in which it is a module. In other words, the preview button 508 is available for making an intermediate checking step before making a configuration active. This is beneficial to the user because the user may use the results of preview packet classification to determine that the classification is a valid classification before applying the classification to a general purpose packet classifier 202. Likewise, if a preview packet classification is invalid, simply previewing the packet classification using preview packet classifier 204 will not negatively affect any instrument in which it is a module.

Portion 510 of GUI 500 may display the results of preview packet classification. Portion 510 may include a link portion and a packet portion. Link portion may contain information related to the packet fields selected in portion 506. For example, FIG. 5 shows two links, link1: 10.64.33.15:02:01->02 and link2: 10.64.33.15:02:01<-02. Value 10.64.33.15 may represent an IP address of a chassis, value :02: may represent a card number on the chassis, and value :01 may represent a port on the chassis. Value->02 may represent a port on impairment instrument 100. Link1 may represent a link from an external chassis to impairment instrument 100 while link2 may represent a link from impairment instrument 100 to an external chassis. Packets portion contains a count of the number of packets which have traversed the respective link. For example, as shown in FIG. 5, 100 packets have traversed link1. In other words, packets portion contains a count of the number of packets which match preview packet classification.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for packet classification previewing, the method comprising:
   in an impairment instrument:
   providing a reserved preview packet classifier;
   providing a plurality of general purpose packet classifiers;
   receiving user input to classify packets using the preview packet classifier and the general purpose packet classifiers;

in response to the user input, initiating classification of packets using the preview packet classifier and the general purpose packet classifiers, wherein the preview packet classifier is configured to classify packets without affecting packet classification by the general purpose packet classifiers or impairments and to provide an indication of the effect of a planned change in packet classification by the general purpose packet classifiers;

applying impairments to packets classified by the general purpose packet classifiers, wherein the impairments include at least one of: delay of packets, packet drop, re-ordering of packets, packet duplication, and emulation of error conditions;

generating preview packet classification results, wherein generating preview packet classification results includes incrementing a counter if a packet entering the preview packet classifier matches the user input, wherein the counter is configured to provide a non-zero packet count in response to classifying at least one packet matching a configuration of the preview packet classifier, and wherein the non-zero packet count provides an indication to the user that the configuration of the preview packet classifier will function correctly if assigned to one of the general purpose packet classifiers so that the user can copy the configuration of the preview packet classifier to one of the general purpose packet classifiers; and displaying the preview packet classification results to the user.

2. The method of claim 1 wherein the user input is received from a graphical user interface.

3. The method of claim 1 wherein the user input includes at least one packet header field value.

4. The method of claim 1 wherein initiating classification of the packets includes determining whether headers of the packets contain information that matches the user input.

5. The method of claim 1 wherein the general purpose packet classifiers are configured to classify the packets into at least one flow.

6. The method of claim 1 comprising using preview packet classification results to decide whether to apply impairment to packets matching the preview packet classifier.

7. The method of claim 1 comprising transmitting the packets in the same condition as received by the preview packet classifier.

8. The method of claim 1 wherein providing the preview packet classifier includes providing a graphical user interface activated button for initiating packet classification previewing.

9. The method of claim 1 comprising receiving input from the user for initiating general purpose packet classification based on the preview packet classification results.

10. A system for packet classification previewing, the system comprising:
an impairment instrument including:
an interface configured to receive a plurality of packets;
a plurality of general purpose packet classifiers configured to classify received packets;
a preview packet classifier configured to:
receive user input to classify packets;
initiate classification of packets in response to the user input, wherein the preview packet classifier is configured to classify packets without affecting packet classification by the general purpose packet classifiers or impairments and to provide an indication of the effect of a planned change in packet classification by the general purpose packet classifiers;
generate preview packet classification results;
the preview packet classifier including a counter, wherein generating preview packet classification results includes incrementing the counter if a packet entering the preview packet classifier matches the user input, wherein the counter is configured to provide a non-zero packet count in response to classifying at least one packet matching a configuration of the preview packet classifier, and wherein the non-zero packet count provides an indication to the user that the configuration of the preview packet classifier will function correctly if assigned to one of the general purpose packet classifiers so that the user can copy the configuration of the preview packet classifier to one of the general purpose packet classifiers;
an impairment machine configured to apply impairments to packets classified by the general purpose packet classifiers, wherein the impairments include at least one of: delay of packets, packet drop, re-ordering of packets, packet duplication, and emulation of error conditions; and
a graphical user interface for displaying the preview packet classification results to the user.

11. The system of claim 10 wherein the user input includes at least one packet header field value.

12. The system of claim 10 wherein the preview packet classifier is configured to initiate classification by comparing headers of the packets to the user input.

13. The system of claim 10 wherein the preview packet classifier is configured to transmit the packets to at least one of the general purpose packet classifiers for classifying the packets into at least one flow.

14. The system of claim 10 wherein the preview packet classification results are used to decide whether to apply impairment to packets matching the preview packet classifier using the impairment machine.

15. The system of claim 10 wherein the preview packet classifier is configured to transmit packets in the same condition as received at the preview packet classifier.

16. The system of claim 10 comprising a graphical user interface activated button for initiating packet classification previewing.

17. The system of claim 10 comprising a graphical user interface for receiving input from the user for initiating general purpose packet classification based on the preview packet classification results.

18. A non-transitory computer readable medium having stored thereon executable instructions that when executed by the processor of a computer control the computer to perform packet classification previewing steps comprising:
in an impairment instrument:
providing a reserved preview packet classifier;
providing a plurality of general purpose packet classifiers;
receiving user input to classify packets using the preview packet classifier;
in response to the user input, initiating classification of packets using the preview packet classifier and the general purpose packet classifiers, wherein the preview packet classifier is configured to classify packets without affecting packet classification by the general purpose packet classifiers or impairments and to provide an indication of the effect of a planned change in packet classification by the general purpose packet classifiers;
applying impairments to packets classified by the general purpose packet classifiers, wherein the impairments include at least one of: delay of packets, packet drop, re-ordering of packets, packet duplication, and emulation of error conditions;

generating packet classification preview results, wherein generating preview packet classification results includes incrementing a counter if a packet entering the preview packet classifier matches the user input, wherein the counter is configured to provide a non-zero packet count in response to classifying at least one packet matching a configuration of the preview packet classifier, and wherein the non-zero packet count provides an indication to the user that the configuration of the preview packet classifier will function correctly if assigned to one of the general purpose packet classifiers so that the user can copy the configuration of the preview packet classifier to one of the general purpose packet classifiers; and displaying the preview packet classification results to the user.

* * * * *